United States Patent
Mullins et al.

(10) Patent No.: US 10,110,883 B2
(45) Date of Patent: Oct. 23, 2018

(54) BIDIRECTIONAL HOLOGRAPHIC LENS

(71) Applicant: DAQRI, LLC, Los Angeles, CA (US)

(72) Inventors: Brian Mullins, Altadena, CA (US); Matthew Kammerait, Studio City, CA (US)

(73) Assignee: DAQRI, LLC, Los Angeles, CA (US)

( * ) Notice: Subject to any disclaimer, the term of this patent is extended or adjusted under 35 U.S.C. 154(b) by 85 days.

(21) Appl. No.: 15/283,163

(22) Filed: Sep. 30, 2016

(65) Prior Publication Data
US 2017/0094265 A1    Mar. 30, 2017

Related U.S. Application Data

(60) Provisional application No. 62/235,018, filed on Sep. 30, 2015.

(51) Int. Cl.
*H04N 13/00*    (2018.01)
*G02F 1/33*    (2006.01)
(Continued)

(52) U.S. Cl.
CPC ......... *H04N 13/327* (2018.05); *G02B 5/1828* (2013.01); *G02B 27/0172* (2013.01);
(Continued)

(58) Field of Classification Search
None
See application file for complete search history.

(56) References Cited

U.S. PATENT DOCUMENTS

| 6,512,635 B1* | 1/2003 | Takeyama .......... G02B 27/0172 250/494.1 |
| 2002/0071172 A1* | 6/2002 | Naiki .................. G02F 1/33 359/305 |

(Continued)

FOREIGN PATENT DOCUMENTS

| WO | WO-2014188149 A1 * | 11/2014 | ........... G02B 27/017 |
| WO | WO-2014188149 A1 | 11/2014 | |

(Continued)

OTHER PUBLICATIONS

"International Application Serial No. PCT/US2016/055038, International Search Report dated Jan. 4, 2017", 4 pgs.
(Continued)

*Primary Examiner* — Anand S Rao
*Assistant Examiner* — Tyler B Edwards
(74) *Attorney, Agent, or Firm* — Schwegman Lundberg & Woessner, P.A.

(57) ABSTRACT

A device can determine a distance to an object. The device can use the determined distance to vary a focal length of a first adjustable element so that the first adjustable element directs light from the object into a first waveguide and onto a detector, and forms an image of the object at the detector. The device can produce an image, such as augmented content, on a panel. The device can direct light from the panel into a second waveguide. The device can use the determined distance to vary a focal length of a second adjustable element so that the second adjustable element directs light out of the second waveguide and forms a virtual image of the panel in a plane coincident with the object. The device can operate as an augmented reality headset. The adjustable elements can be phase modulators, or acoustically responsive material with surface acoustic wave transducers.

12 Claims, 11 Drawing Sheets

(51) Int. Cl.
*G02B 27/01* (2006.01)
*G02F 1/29* (2006.01)
*H04N 13/327* (2018.01)
*H04N 13/339* (2018.01)
*H04N 13/344* (2018.01)
*H04N 13/398* (2018.01)
*G02B 5/18* (2006.01)
*G06T 19/00* (2011.01)
*G02B 27/00* (2006.01)

(52) U.S. Cl.
CPC ......... *G02B 27/0179* (2013.01); *G02F 1/292* (2013.01); *G02F 1/332* (2013.01); *H04N 13/339* (2018.05); *H04N 13/344* (2018.05); *H04N 13/398* (2018.05); *G02B 27/0093* (2013.01); *G02B 2027/0125* (2013.01); *G02B 2027/0174* (2013.01); *G02B 2027/0185* (2013.01); *G02F 2001/294* (2013.01); *G02F 2202/20* (2013.01); *G06T 19/006* (2013.01); *H04N 2213/001* (2013.01)

(56) References Cited

U.S. PATENT DOCUMENTS

| 2011/0007277 | A1 | 1/2011 | Solomon | |
| 2013/0314793 | A1* | 11/2013 | Robbins | G02B 5/18 |
| | | | | 359/573 |
| 2014/0140653 | A1* | 5/2014 | Brown | G02B 6/0033 |
| | | | | 385/10 |

FOREIGN PATENT DOCUMENTS

WO  WO-2015095417 A1  6/2015
WO  2017059379  4/2017

OTHER PUBLICATIONS

"International Application Serial No. PCT/US2016/055038, Written Opinion dated Jan. 4, 2017", 9 pgs.

* cited by examiner

BIDIRECTIONAL HOLOGRAPHIC LENS

CROSS-REFERENCE TO RELATED APPLICATION

This application claims the benefit of U.S. Provisional Application No. 62/235,018, filed on Sep. 30, 2015, which is hereby incorporated by reference in its entirety.

TECHNICAL FIELD

The subject matter disclosed herein generally relates to a bidirectional holographic lens and, in particular, to a bidirectional holographic lens that creates a diffraction grating when excited with radiofrequency ("RF") energy.

BACKGROUND

Holography enables three-dimensional (3D) images to be recorded in an optical medium for later reconstruction and display. Typically, a hologram is constructed by optical interference of two coherent laser beams in a film or a grating. As such the laser recording imparts static optical properties such as fixed depth encoded lights in the grating. The characteristics of the grating do not change once the recording is performed. As such, static optical properties of gratings can be difficult to use in Augmented Reality (AR) devices since the user's relative position is dynamic. AR devices allow users to observe a scene while simultaneously seeing relevant virtual content that may be aligned to items, images, objects, or environments in the field of view of the device or user. However, the user may move the devices relative to the items and stationary objects in space. Since the depth of field for the virtual content is fixed based on the recorded grating, the user may perceive a disparity between the real object and the virtual content.

A traditional lens is typically made of a single material, such as glass. Such a traditional lens is incapable of producing a holographic image. Other lenses, such as polarized lenses or stereoscopic lenses, often require that the image being viewed is being displayed with polarized light or specifically encoded with the stereoscopic information. Thus, whether a three-dimensional view of an image is possible is often dependent upon the light source or the source material.

BRIEF DESCRIPTION OF THE DRAWINGS

Some embodiments are illustrated by way of example and not limitation in the figures of the accompanying drawings.

DETAILED DESCRIPTION

A device can determine a distance to an object. The device can use the determined distance to vary a focal length of a first adjustable element so that the first adjustable element directs light from the object into a first waveguide and onto a detector, and forms an image of the object at the detector. The device can produce an image, such as augmented content, on a panel. The device can direct light from the panel into a second waveguide. The device can use the determined distance to vary a focal length of a second adjustable element so that the second adjustable element directs light out of the second waveguide and forms a virtual image of the panel in a plane coincident with the object. The device can operate as an augmented reality headset. The adjustable elements can be phase modulators, or acoustically responsive material with surface acoustic wave transducers.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

This disclosure provides for a Holographic display that records data from a scene while simultaneously displaying augmented reality content to the user. In one embodiment, the display is implemented as a single-layer lens having one or more waveguides disposed thereon that collects light and images from one side of the lens and projects those images (or augmented reality-versions of said images) on the other side of the lens. In another embodiment, the display is implemented as a multi-layer lens having one or more waveguides disposed therein. In either embodiments, the one or more waveguides are connected to either a fiber coupler or charge-coupled device ("CCD") array to collect data and store it for future use.

In yet another embodiment, an example lens is constructed from multiple layers of lithium niobate ($LiNbO_3$). One or more surface acoustic wave ("SAW") transducers are fastened or secured to one or more layers of the lens for generating a wave within one or more of the layers. The generated wave creates a diffraction grating by the one or more layers, which causes an image being viewed to be shown in three-dimensions. The RF energy used to excite the SAW transducers may be varied so as to create different diffraction gratings within the layers.

Figure 1:
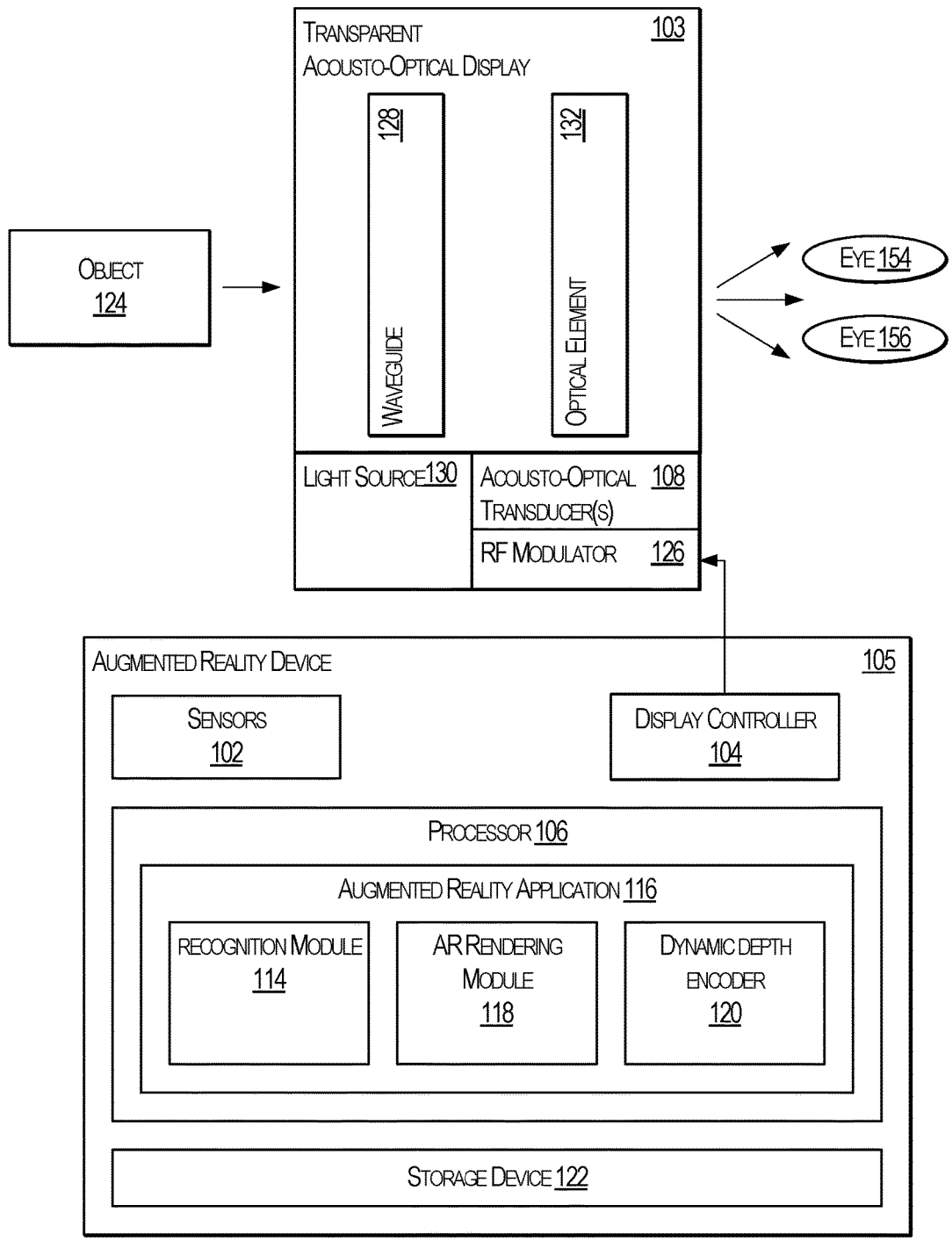
FIG. 1 is a block diagram illustrating an augmented reality device, according to an example embodiment, coupled to a transparent acousto-optical display.

FIG. 1 is a block diagram illustrating an augmented reality device 105, according to an example embodiment, coupled to a transparent acousto-optical display 103. In general, an acousto-optical display is a transparent display that is controlled by acoustic waves delivered via an acoustic element, such as a surface acoustic wave transducer. The transparent acousto-optical display 103 includes a one or more waveguides secured to an optical element 132 (or medium). Light reflected off an object 124 travels through one or more layers of the waveguide 128 and/or the optical element 132 to eyes 154, 156 of a user. In one embodiment, one or more waveguides 128 transport light from a dedicated light source 130 that is then diffracted through one or more layers of the optical elements 132. Examples of the light source 130 include laser light, light emitting diodes ("LEDS"), organic light emitting diodes ("OLEDS"), cold cathode fluorescent lamps ("CCFLS"), or combinations thereof. Where the light source 130 is laser light, the light source 130 may emit the laser light in the wavelengths of 620-750 nm (e.g., red light), 450-495 nm (e.g., blue light), and/or 495-570 nm (e.g., green light). In some embodiments, a combination of laser lights are used as the light source 130. The transparent display 103 may also include, for example, a transparent OLED. In other embodiments, the transparent display 103 includes a reflective surface to reflect an image projected onto the surface of the transparent display 103 from an external source such as an external projector. Additionally or alternatively, the transparent display 103 includes a touchscreen display configured to receive a user input via a contact on the touchscreen display. The transparent display 103 may include a screen or monitor configured to display images generated by the processor 106. In another example, the optical element 132 may be transparent or semi-opaque so that the user can see through it (e.g., a Heads-Up Display).

The acousto-optical display 103 may be communicatively coupled to one or more acousto-optical transducers 108, which modify the optical properties of the optical element 132 at a high frequency. For example, the optical properties of the optical element 132 may be modified at a rate high enough so that individual changes are not discernable to the naked eyes 154, 156 of the user. For example, the transmitted light may be modulated at a rate of 60 Hz or more.

The acousto-optical transducers 108 are communicatively coupled to one or more radiofrequency ("RF") modulators 126. The RF modulator 126 generates and modulates an electrical signal provided to the acousto-optical transducers 108 to generate an acoustic wave on the surface of the optical element, which can dynamically change optical properties, such as the diffraction of light out of the optical element 132, at a rate faster than perceived with human eyes 154, 156.

The RF modulator 126 is one example of means to modulate the optical element 132 in the transparent acousto-optical display 103. The RF modulator 126 operates in conjunction with the display controller 104 and the acousto-optical transducers 108 to allow for holographic content to be displayed via the optical element 132. As discussed below, the display controller 104 modifies a projection of the virtual content in the optical element 132 as the user moves around the object 116. In response, the acousto-optical transducers 108 modify the holographic view of the virtual content perceived by the eyes 154, 156 based on the user's movement or other relevant positional information. For example, additionally or alternatively to the user's movement, the holographic view of the virtual content may be changed in response to changes in environmental conditions, user-provided input, changes in objects within the environment, and other such information or combination of information.

The AR device 105 produces one or more images and signals, such as holographic signals and/or images, via the transparent acousto-optical display 103 using the RF modulator(s) 126 and the acousto-optical transducers 108. In one embodiment, the AR device 105 includes sensors 102, a display controller 104, a processor 106, and a storage device 122. For example, the AR device 105 may be part of a wearable computing device (e.g., glasses or a helmet), a desktop computer, a vehicle computer, a tablet computer, a navigational device, a portable media device, or a smart phone of a user. The user may be a human user (e.g., a human being), a machine user (e.g., a computer configured by a software program to interact with the AR device 105), or any suitable combination thereof (e.g., a human assisted by a machine or a machine supervised by a human).

The sensors 102 include, for example, a proximity or location sensor (e.g., Near Field Communication, GPS, Bluetooth, Wi-Fi), an optical sensor (e.g., a camera), an orientation sensor (e.g., a gyroscope), an audio sensor (e.g., a microphone), or any suitable combination thereof. For example, the sensors 102 may include a rear-facing camera and a front-facing camera in the viewing AR device 105. It is noted that the sensors 102 described herein are for illustration purposes; the sensors 102 are thus not limited to the ones described. The sensors 102 may be used to generate internal tracking data of the AR device 105 to determine what the AR device 105 is capturing or looking at in the real physical world.

The sensors 102 may also include a first depth sensor to measure the distance of the object 124 from the transparent display 103. The sensors 102 include a second depth sensor to measure the distance between the optical element 132 and the eyes 154, 156.

In another example, the sensors 102 may include an eye tracking device to track a relative position of the eye. The eye tracking data may be fed into the display controller 104 and the RF modulator 108 to generate a higher resolution version of the virtual object and further adjust the depth of field of the virtual object at a location in the transparent display corresponding to a current position of the eye.

The display controller 104 communicates data signals to the transparent display 103 to display the virtual content. In another example, the display controller 104 communicates data signals to an external projector to project images of the virtual content onto the optical element 132 of the transparent display 103. The display controller 104 includes hardware that converts signals from the processor 106 to display such signals. In one embodiment, the display controller 104 is implemented as one or more graphical processing units (GPUs), such as those that are commercially available from Advanced Micro Devices Inc. or Nvidia Corporation.

The processor 106 may include an AR application 116 for processing an image of a real world physical object (e.g., object 116) and for generating a virtual object in displayed by the transparent acousto-optical display 103 corresponding to the image of the object 116. In one example embodiment, the AR application 116 may include a recognition module 114, an AR rendering module 118, and a dynamic depth encoder 120.

In one embodiment, the recognition module 114 identifies one or more objects near or surrounding the AR device 105. The recognition module 114 may detect, generate, and identify identifiers such as feature points of the physical object being viewed or pointed at by the AR device 105 using an optical device (e.g., sensors 102) of the AR device 105 to capture the image of the physical object. As such, the recognition module 114 may be configured to identify one or more physical objects. The identification of the object may be performed in many different ways. For example, the recognition module 114 may determine feature points of the object based on several image frames of the object. The recognition module 114 also determines the identity of the object using any visual recognition algorithm. In another example, a unique identifier may be associated with the object. The unique identifier may be a unique wireless signal or a unique visual pattern such that the recognition module 114 can look up the identity of the object based on the unique identifier from a local or remote content database. In another example embodiment, the recognition module 114 includes a facial recognition algorithm to determine an identity of a subject or an object.

Furthermore, the recognition module 114 may be configured to determine whether the captured image matches an image locally stored in a local database of images and corresponding additional information (e.g., three-dimensional model and interactive features) in the storage device 122 of the AR device 105. In one embodiment, the recognition module 114 retrieves a primary content dataset from an external device, such as a server, and generates and updates a contextual content dataset based on an image captured with the AR device 105.

The AR rendering module 118 generates the virtual content based on the recognized or identified object 116. For example, the virtual content may include a three-dimensional rendering of King Kong based on a recognized picture of the Empire State building.

The dynamic depth encoder 120 determines depth information of the virtual content based on the depth of the content or portion of the content relative to the transparent acousto-optical display 103. The display controller 104 utilizes this depth information to generate the RF signal which drives the acousto-optical transducers 108. The generated surface acoustic wave in the optical element 132 alters the diffraction of light through the optical element 132 to produce a holographic image with the associated depth of field information of the content. Through acousto-optic modulation, light can be modulated through the optical element 132 at a high rate (e.g., frequency) so that the user does not perceive individual changes in the depth of field. In another example, the dynamic depth encoder 120 adjusts the depth of field based on sensor data from the sensors 102. For example, the depth of field may be increased based on the distance between the transparent display 103 and the object 116. In another example, the depth of field may be adjusted based on a direction in which the eyes are looking.

Figure 2:
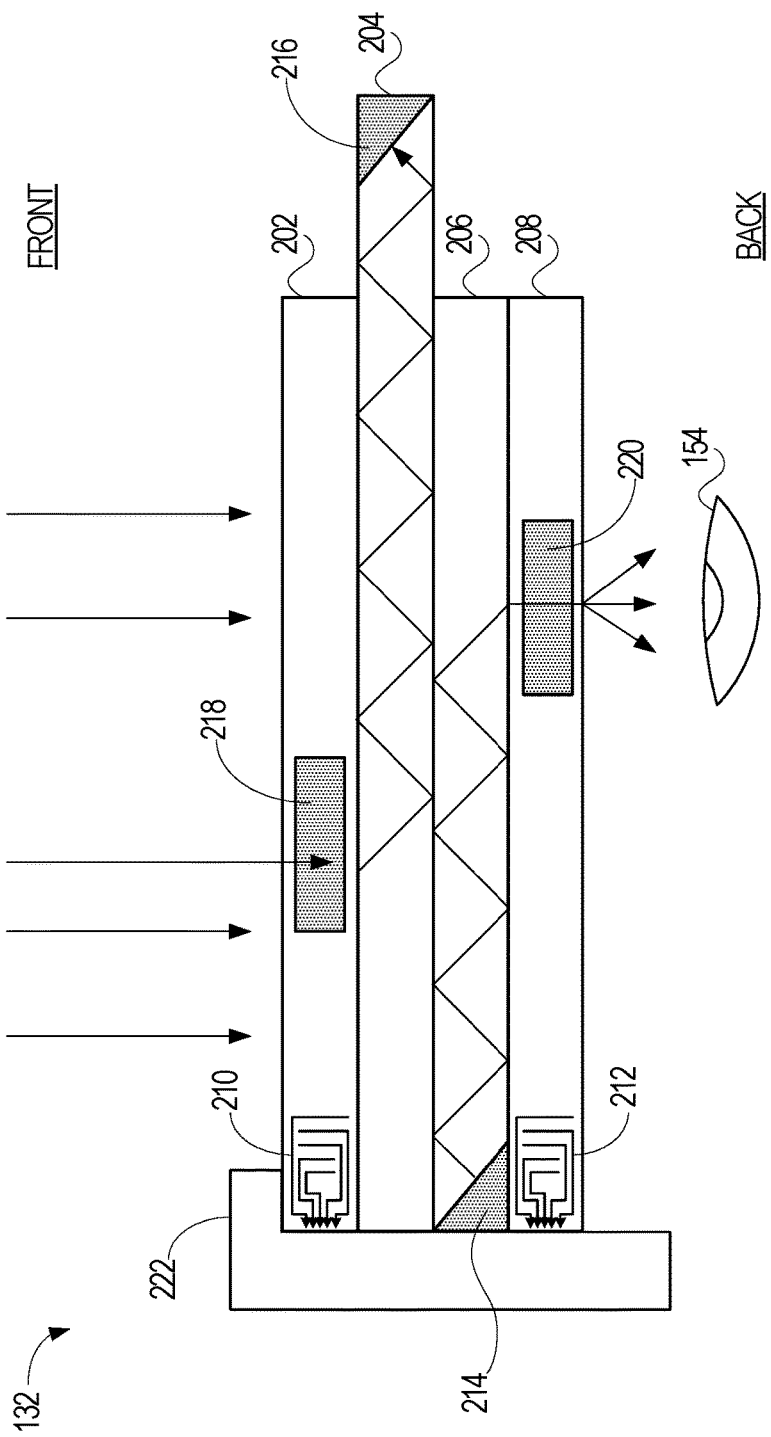
FIG. 2 is a top view of a bidirectional holographic lens, according to an example embodiment.

The optical element 132 may be constructed from one or more layers of a reflective material to effect the depth of field of the virtual object. In particular, and in one embodiment, the optical element 132 is a multilayer holographic lens. In another embodiment, the optical element 132 is a single-layer lens. FIG. 2 is a top view of the bi-directional holographic lens, according to an example embodiment. In the embodiment shown in FIG. 2, the bi-directional holographic lens is constructed from multiple layers 202-208. As examples of the layers 202-208, a first (or front layer) layer 202 is a dynamic hologram grating substrate, such as lithium niobate ($LiNbO_3$). A second layer 204, which may be a first interior layer, is a waveguide for guiding light received by the first layer 202. A third layer 206, e.g., a second interior layer, is another waveguide for directing light, which may be provided by a display driver embedded within a lens securing mechanism 222. Finally, a fourth (or back) layer 208 is also a dynamic grating substrate. In another embodiment, the bi-directional lens is implemented as a single-layer lens, where the single-layer lens may include a layer of $LiNbO_3$ and a waveguide layer. In yet further embodiments, the waveguide is disposed within the layer of $LiNbO_3$.

In FIG. 2, the dynamic grating substrates (e.g., the first layer 202 and the fourth layer 208), are coupled with surface-acoustic wave (SAW) transducers, such as SAW transducer 210 and SAW transducer 212. The SAW transducers 210-212 are coupled to the lens securing mechanism 222 and a driven by a display driver (not shown) embedded, or affixed, thereto. As the display driver energizes the SAW transducers 210-212, the SAW transducers 210-212 vibrate, which cause the first and fourth layers 202, 208 to create, or establish, a holographic gratings 218, 220, respectively, therein. The holographic gratings 218,220 receive light, which may be depth-encoded and passed through waveguides 204,206, to create a depth-encoded image on the eye 154 of the user.

Figure 3:
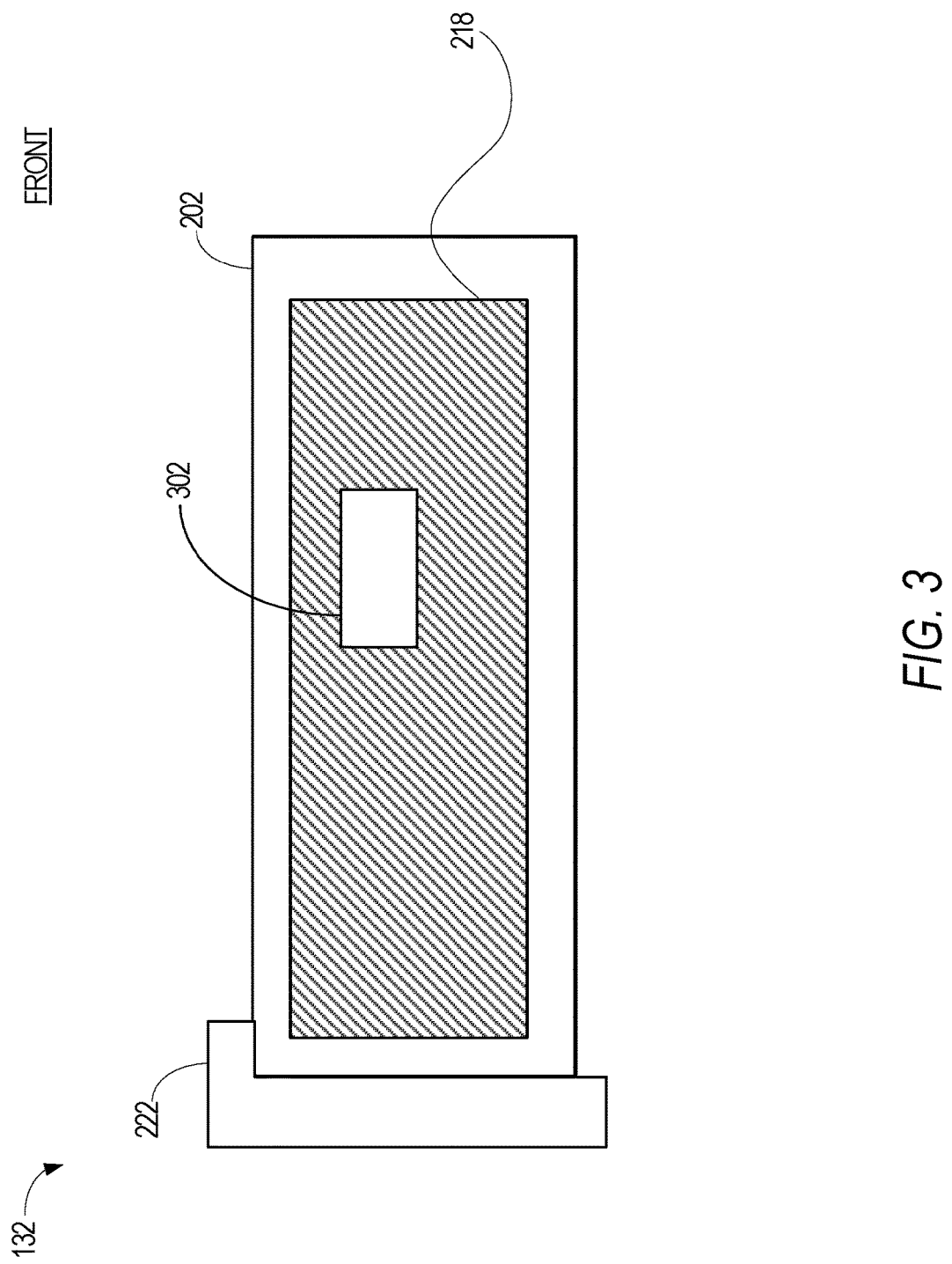
FIG. 3 is a front view of the bidirectional holographic lens of FIG. 2, according to an example embodiment.

In one embodiment, the waveguides 204,206 are configured to direct light to one or more holographic gratings, which may be instantiated in the fourth layer 208. In addition, the waveguides 204, 206 may include optical couplers, such as coupler 214 and coupler 216, which couple the waveguides 206,204, respectively, to various optical elements of the bidirectional holographic lens. In one embodiment, the optical coupler 216 couples the waveguide 204 to a charged-coupled device (CCD) sensor, which detects light received by the first layer 202. In addition, the optical coupler 214 couples the waveguide 206 to the lens securing mechanism 222 and a display driver (not shown) contained therein, which receives light (e.g., depth-encoded light) provided by the display driver. FIG. 3 illustrates a front view of the holographic lens of FIG. 1 according to an example embodiment. As shown in FIG. 3, a holographic grating 218 has been created in the dynamic holographic grating substrate 202 (e.g., the first layer 202). As discussed above, and in one embodiment, the holographic grating 218 is created by a SAW transducer 210 coupled, or affixed, to the dynamic holographic grating substrate 202. In addition, as the SAW transducer 210 is responsive to a display driver, the SAW transducer 210 can shape the holographic grating 218 so as to create a non-grating opening 302 that moves with the pupil direction of the eye 154. In this manner, the SAW transducer 210 can create the non-grating opening 302 when a holographic grating is not needed or, in some instances, when a holographic grating is desired for one eye but a holographic grating is not desired for the other eye.

While the foregoing discussion of FIGS. 2-3 discuss the bidirectional holographic lens with respect to one eye (e.g., eye 154), one of ordinary skill in the art will recognize that such discussion is also applicable to the other eye (e.g., eye 156). Thus, the layers 202-208 illustrated in FIG. 2 and the layer 202 illustrated in FIG. 3 should be understood as encompassing one eye, and that a similar structure is provided for the second eye as well.

In the configurations of FIGS. 2-3, the optical element 132 can be configured as a device that can form an image of an object, where the object can be positioned at a finite distance away from the device (e.g., not infinitely far away).

A top waveguide 204 can have a top surface facing the object (e.g., facing the front of the device in FIG. 2), a bottom surface parallel to the top surface, and a first end along an edge of the top waveguide 204. A multi-pixel detector can be disposed at the first end of the top waveguide. A coupler 216 can couple light from the top waveguide 204 to the multi-pixel detector. A top lithium niobate layer 202 can be positioned along the top surface of the top waveguide 204. A top plurality of surface acoustic wave transducers 210 can be coupled to the top lithium niobate layer 202. A controller can receive position data corresponding to the finite distance to the object. The controller can further actuate the top plurality of surface acoustic wave transducers 210 in response to the position data such that when energized, the top plurality of surface acoustic wave transducers 210 produce a top lens pattern in the top lithium niobate layer 202.

The top lens pattern can have a focal length selected to form the image of the object in a plane coincident with the multi-pixel detector. The focal length f can be calculated from the formula 1/f=1/do+1/di, where do is the distance from the top lens pattern to the object, and di is a distance from the top lens pattern to the image. In these examples, distance di can represent an optical path traveled through the top waveguide. The top lens pattern can direct at least a first fraction of light from the object into the top waveguide 204 and form an image of the object on the multi-pixel detector. The first fraction can be between 0% and 100%.

A bottom waveguide 206 can have a top side positioned proximate the bottom surface of the top waveguide 204, a bottom surface parallel to the top surface of the bottom waveguide 206, and a first end along an edge of the bottom waveguide 206. A multi-pixel image panel can be disposed at the first end of the bottom waveguide 206. A coupler 214 can couple light from the multi-pixel image panel into the bottom waveguide 206. A bottom lithium niobate layer 208 can be positioned along the bottom surface of the bottom waveguide 206. A bottom plurality of surface acoustic wave transducers 212 can be coupled to the bottom lithium niobate layer 208. The controller can further actuate the bottom plurality of surface acoustic wave transducers 212 in response to the position data such that when energized, the bottom plurality of surface acoustic wave transducers 212 produce a bottom lens pattern in the bottom lithium niobate layer 208. The bottom lens pattern can have a focal length selected to form a virtual image of the multi-pixel image panel in a plane coincident with the object. The bottom lens pattern can direct at least a second fraction of light from the multi-pixel image panel out of the bottom waveguide 206 and form a virtual image of the multi-pixel image panel in the plane coincident with the object.

There can be other configurations for the device shown in FIGS. 2-3. For example, another suitable configuration can replace the lithium niobate layers and surface acoustic wave transducers with multi-region phase modulators. The multi-region phase modulators include an array of pixels, with each pixel being independently controllable. In response to an applied voltage, each pixel can impart a phase to a transmitted or reflected beam, with the phase being controllable to include values between zero and $2\pi$. Such a configuration using multi-region phase modulators is shown in FIGS. 6-9 and explained below.

Figure 6:
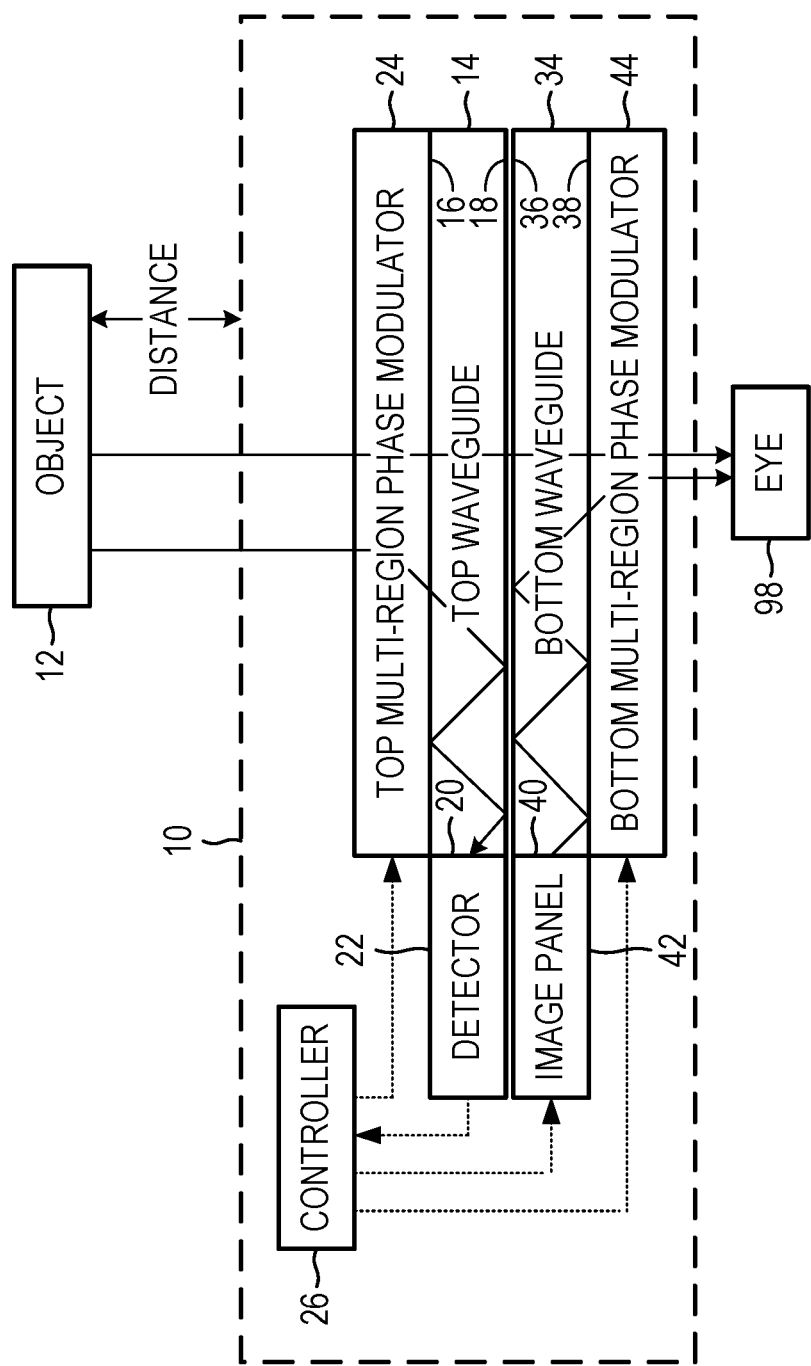
FIG. 6 shows an example of a device for forming an image of an object, in accordance with some embodiments.

FIG. 6 shows an example of a device 10 configured to form an image of an object 12, in accordance with some embodiments. In some examples, the device can be configured as a wearable headset, and can be positioned proximate an eye 98 of a user. The device 10 is but one example of such a device; other examples can also be used.

A top waveguide 14 can have a top surface 16 facing the object 12, a bottom surface 18 parallel to the top surface 16, and a first end 20 along an edge of the top waveguide 14.

A multi-pixel detector 22 can be disposed at the first end 20 of the top waveguide 14.

A top multi-region phase modulator 24 can be positioned along the top surface 16 of the top waveguide 14.

A controller 26 can receive position data corresponding to the finite distance to the object. In some examples is provided by a subsystem of the device 10 that can measure the distance of some or all objects in a field of view of the device 10. The controller 26 can further energize the top multi-region phase modulator 24 in response to the position data such that when energized, the top multi-region phase modulator 24 can direct at least a first fraction of light from the object 12 into the top waveguide 14 and can form an image of the object 12 on the multi-pixel detector 20.

A bottom waveguide 34 can have a top surface 36 positioned proximate the bottom surface 18 of the top waveguide 14, a bottom surface 38 parallel to the top surface 36 of the bottom waveguide 34, and a first end 40 along an edge of the bottom waveguide 34.

A multi-pixel image panel 42 can be disposed at the first end 40 of the bottom waveguide 34.

A bottom multi-region phase modulator 44 can be positioned along the bottom surface 38 of the bottom waveguide 34.

The controller 26 can further energize the bottom multi-region phase modulator 44 in response to the position data such that when energized, the bottom multi-region phase modulator 44 can direct at least a second fraction of light from the multi-pixel image panel 42 out of the bottom waveguide 34 and can form a virtual image of the multi-pixel image panel 42 in a plane coincident with the object 12.

Figure 7:
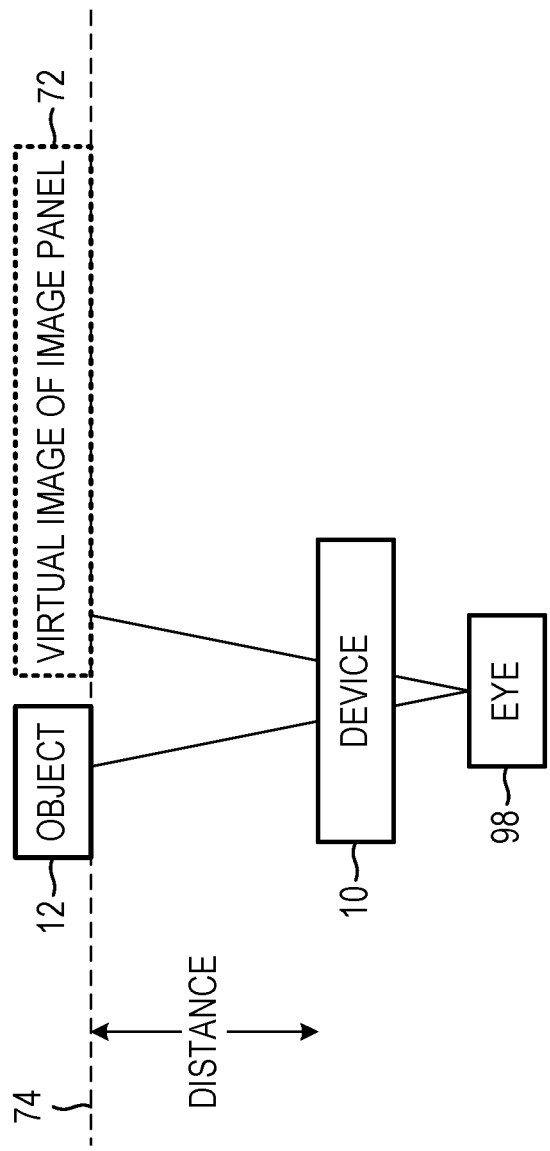
FIG. 7 shows an example of a configuration in which the device of FIG. 6 is used as an augmented reality headset, in accordance with some embodiments.

FIG. 7 shows an example of a configuration in which the device 10 of FIG. 6 is used as an augmented reality headset, in accordance with some embodiments. This is but one suitable configuration for using the device of FIG. 6; other suitable configurations can also be used.

The device 10 can be worn as an augmented reality headset, positioned in front of an eye 98 of a user. A similar device can be used for the other eye of the user. The device 10 can determine a distance to an object 12. Based on the determined distance, the controller 26 can adjust a focal length of a lens pattern on the top multi-region phase modulator 24 so that the lens pattern forms an image of the object 12 on the multi-pixel detector 22. The controller 26 can determine augmented content to display on top of or alongside the object 12. The controller 26 can control the multi-pixel image panel 42 to produce a light pattern resembling the determined augmented content. The controller 26 can adjust a focal length of a lens pattern on the bottom multi-region phase modulator 44 so that the lens pattern forms a virtual image 72 of the multi-pixel image panel 42 (and its associated light pattern) in a plane 74 coincident with the object 12. The device 10 can display its augmented content at appropriate distances away from the user, which is advantageous. For example, if a user observes an object three meters in front of the device 10, the device 10 can display its augmented content also at three meters in front of the device 10. Compared to augmented reality displays that present their augmented content infinitely far away from the headset, or entirely in a fixed plane, the device 10 is a more realistic representation of the augmented content, and more readily shows an association between an object and its associated augmented content. Further, the device 10 can use time multiplexing and/or spatial multiplexing to work simultaneously with multiple objects, optionally at different depths.

Figure 8:
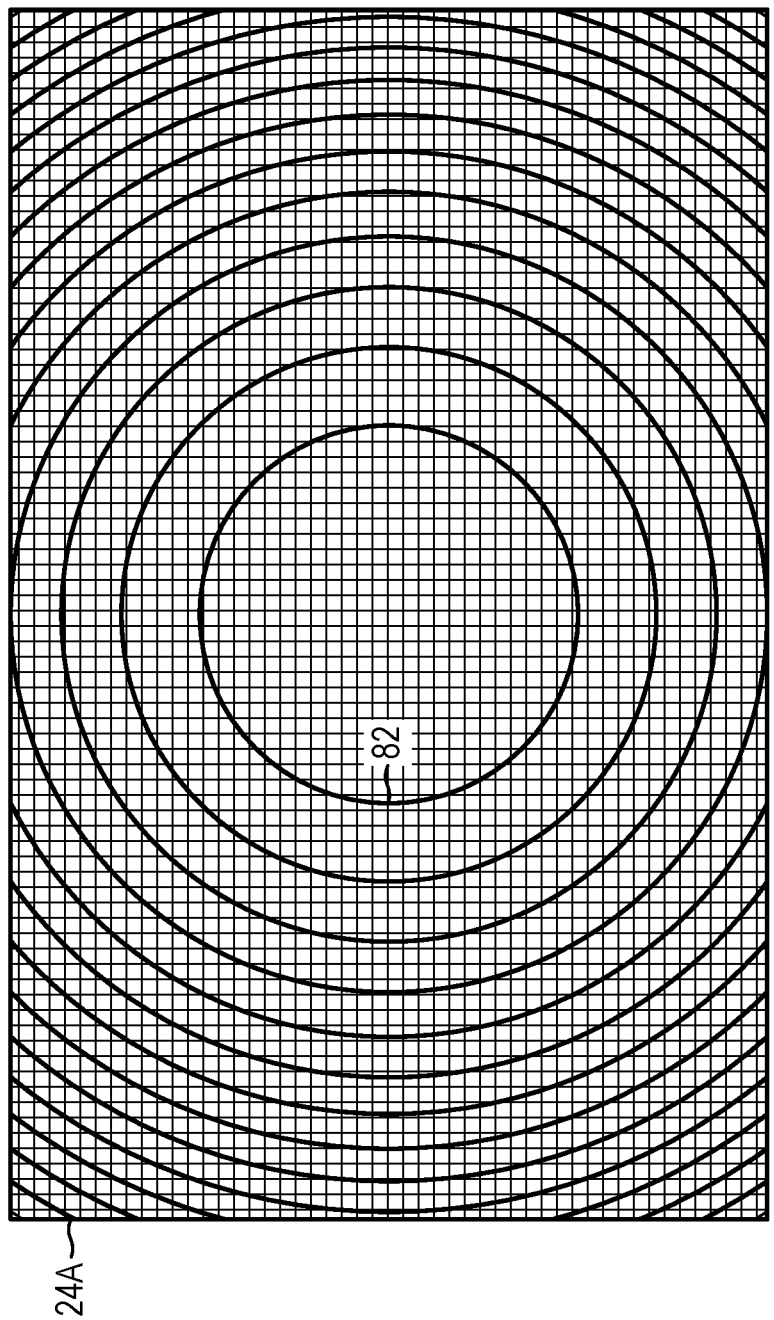
FIG. 8 shows an end-on view of an example of a multi-region phase modulator, in which the top lens pattern extends fully over the top multi-region phase modulator, in accordance with some embodiments.

FIG. 8 shows an end-on view of an example of a multi-region phase modulator 24A, in accordance with some embodiments. The multi-region phase modulator 24A is but one example of a multi-region phase modulator; other examples can also be used. In this example, the regions of the multi-region phase modulator 24A are pixels arranged in a rectangular array. Other pixel layouts can also be used.

In some examples, the controller 26 can further energize the top multi-region phase modulator 24A in a top lens pattern having a focal length selected to form the image of the object 12 in a plane coincident with the multi-pixel detector 22. In other words, the focal length is selected so that the object 12 appears "in-focus" at the multi-pixel detector 22. One example of a multi-pixel detector is a CCD array; other suitable multi-pixel detectors can also be used.

In some examples, the top lens pattern can includes at least portions of a first plurality of concentric circles 82. The first plurality of concentric circles 82 can become more closely spaced at increasing distances from a center of the first plurality of concentric circles 82. In some example, the first plurality of concentric circles 82 can be sized to match those in a Fresnel lens. As known to one of ordinary skill in the art, a Fresnel lens is a lens having a reduced thickness, which includes a plurality of annular sections with step discontinuities between adjacent sections. The controller 26 can dynamically vary the top lens pattern as needed, by varying the focal length of the top lens pattern. The bottom multi-region phase modulator 44 can vary a bottom lens pattern in a similar manner.

In some examples, the controller 26 can further select the first fraction of light directed by the top multi-region phase modulator 24A into the top waveguide 14. The first fraction of light can correspond to a first order diffraction efficiency of the top lens pattern. For a first order diffraction efficiency of 100%, all the incident light is directed into the top waveguide 14. For a first order diffraction efficiency of 0%, none of the incident light is directed into the waveguide 14. The device 10 typically operates with diffraction efficiencies between 0% and 100%.

In some examples, the top waveguide 14 and the top multi-region phase modulator 24 are at least partially transparent when viewed through the bottom and top surfaces. The transparency of the top waveguide 14 and the top multi-region phase modulator 24 correspond to a zeroth order diffraction efficiency of the top lens pattern.

In the example of FIG. 8, the controller 26 is further configured such that the top lens pattern extends fully over the top multi-region phase modulator 24A. In another example, FIG. 9 shows an example in which the controller 26 is further configured such that the top lens pattern extends only partially over the top multi-region phase modulator 24B in an area 92 corresponding to a position of the object 12 in a field of view, in accordance with some embodiments.

The bottom multi-region phase modulator 44 can operate similarly to the top multi-region phase modulator 24. In some examples, the controller 26 can energize the bottom multi-region phase modulator 44 in a bottom lens pattern having a focal length selected to form the virtual image of the multi-pixel image panel 42 in the plane 74 coincident with the object 12.

Figure 9:
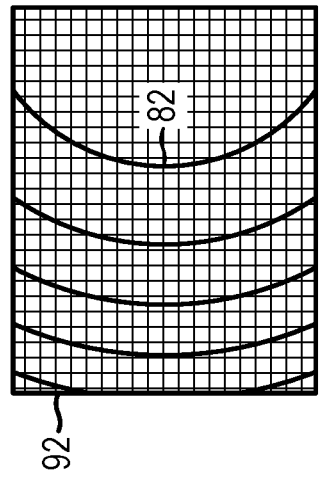
FIG. 9 shows an end-on view of an example of a multi-region phase modulator, in which the top lens pattern extends only partially over the top multi-region phase modulator in an area corresponding to a position of the object in a field of view, in accordance with some embodiments.

The bottom lens pattern can resemble the top lens pattern, as in FIGS. 8-9. In some examples, the bottom lens pattern can include at least portions of a second plurality of concentric circles. The second plurality of concentric circles can become more closely spaced at increasing distances from a center of the second plurality of concentric circles.

In some examples, the controller 26 can further select the second fraction of light directed by the bottom multi-region phase modulator 44 out of the bottom waveguide 34. The second fraction of light can correspond to a first order diffraction efficiency of the bottom lens pattern.

In some examples, the top waveguide 14, the top multi-region phase modulator 24, the bottom waveguide 34, and the bottom multi-region phase modulator 44 are at least partially transparent when viewed through the bottom surface 38 of the bottom waveguide 34 to the top surface 16 of the top waveguide 14.

In some examples, the controller 26 is further configured such that the bottom lens pattern extends only partially over the bottom multi-region phase modulator 44 in an area corresponding to a position of the object in a field of view, as in FIG. 9.

In some examples, the top side 36 of the bottom waveguide 34 can be spaced apart from the bottom side 18 of the top waveguide 14. Such a spacing can include air, a dielectric material such as ceramic, or other suitable spacer. Such a spacing can prevent light from the top waveguide 14 from coupling directly to the bottom waveguide 34, or vice versa.

The device 10 can be used in several different configurations. For example, in the configuration of FIG. 7, in which the device is partially transparent, the device can be used as an augmented reality headset. If the device is adjusted to be zero transparency (e.g., the first order diffraction efficiency is set as close as possible to 100%, and the zeroth order diffraction efficiency is set as close as possible to 0%), then the device 10 can be used as a first-person view camera. If the device is adjusted to be zero transparency, and is inverted top-to-bottom (according to the orientation shown in FIG. 6), the device 10 can be used as an eye-tracker. Further, if the device 10 is modified such that the multi-pixel detector 22 and the multi-pixel image panel 42 are each replaced with a multi-pixel element that both sense multi-pixel light and emit multi-pixel light, then the modified device can operate in a bidirectional manner.

As another example, the positions of the object and eye can be reversed, so that the device 10 can be used as an eye-tracker.

In other configurations, the top and bottom waveguides can be replaced with a single waveguide. In some of these configurations, the waveguide can include four couplers, with two couplers at each longitudinal end of the waveguide. At each end, one coupler can face a top of the waveguide and can couple light to and from the object, and the other coupler can face a bottom of the waveguide and can couple light to and from the eye. In some examples, at each end, one coupler can be passive, and the other coupler can be active.

Figure 10:
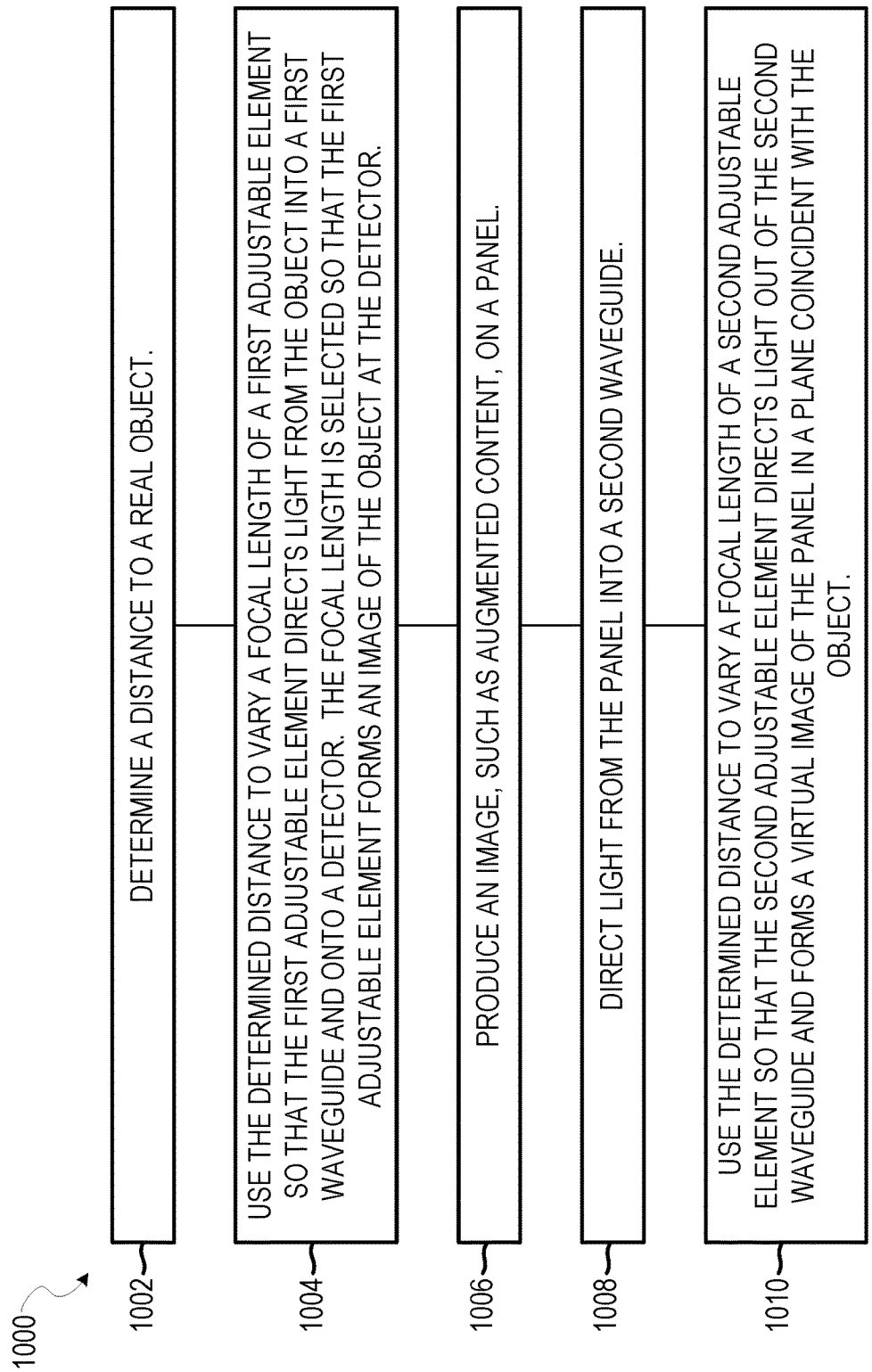
FIG. 10 shows an example of a method for forming an image of a first object, the first object positioned at a finite distance away from a device, in accordance with some embodiments.

FIG. 10 shows an example of a method 1000 for forming a virtual image in a plane coincident with a real object, in accordance with some embodiments. The method can be executed on a suitable device, such as device 10 from FIG. 6 or 132 from FIG. 2, as well as other suitable devices.

At operation 1002, the device 10 or 132 can determine a distance to a real object.

At operation 1004, the device 10 or 132 can use the determined distance to vary a focal length of a first adjustable element so that the first adjustable element directs light from the object into a first waveguide and onto a detector. The focal length is selected so that the first adjustable element forms an image of the object at the detector.

At operation 1006, the device 10 or 132 can produce an image, such as augmented content, on a panel.

At operation 1008, the device 10 or 132 can direct light from the panel into a second waveguide.

At operation 1010, the device 10 or 132 can use the determined distance to vary a focal length of a second adjustable element so that the second adjustable element directs light out of the second waveguide and forms a virtual image of the panel in a plane coincident with the object.

Using the method 1000 of FIG. 10, the device 10 or 132 can operate as an augmented reality headset. The adjustable elements can be phase modulators, or acoustically responsive material with surface acoustic wave transducers.

Figure 11:
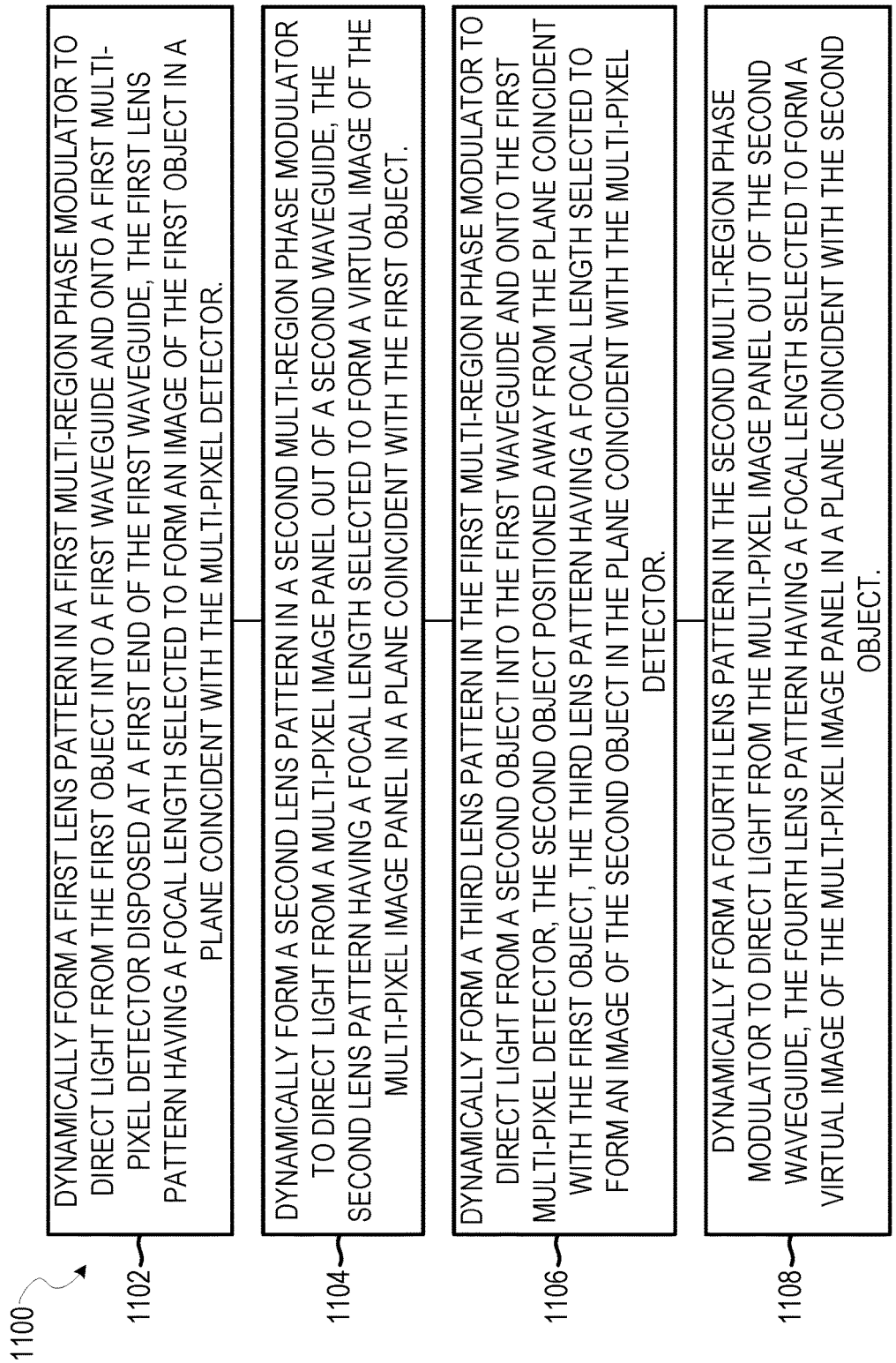
FIG. 11 shows an example of a method for forming an image of a first object, the first object positioned at a finite distance away from a device, in accordance with some embodiments.

FIG. 11 shows an example of a method 1100 for forming an image of a first object, the first object positioned at a finite distance away from a device, in accordance with some embodiments. The method can be executed on a suitable device, such as device 10 from FIG. 6, as well as other suitable devices.

At operation 1102, the device 10 can dynamically form a first lens pattern in a first multi-region phase modulator to direct light from the first object into a first waveguide and onto a first multi-pixel detector disposed at a first end of the first waveguide, the first lens pattern having a focal length selected to form an image of the first object in a plane coincident with the multi-pixel detector.

At operation 1104, the device 10 can dynamically form a second lens pattern in a second multi-region phase modulator to direct light from a multi-pixel image panel out of a second waveguide, the second lens pattern having a focal length selected to form a virtual image of the multi-pixel image panel in a plane coincident with the first object.

At operation 1106, the device 10 can dynamically form a third lens pattern in the first multi-region phase modulator to direct light from a second object into the first waveguide and onto the first multi-pixel detector, the second object positioned away from the plane coincident with the first object, the third lens pattern having a focal length selected to form an image of the second object in the plane coincident with the multi-pixel detector.

At operation 1108, the device 10 can dynamically form a fourth lens pattern in the second multi-region phase modulator to direct light from the multi-pixel image panel out of the second waveguide, the fourth lens pattern having a focal length selected to form a virtual image of the multi-pixel image panel in a plane coincident with the second object.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications and so forth described in conjunction with FIGS. 1-5 are implemented in some embodiments in the context of a machine and an associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Software Architecture

Figure 4:
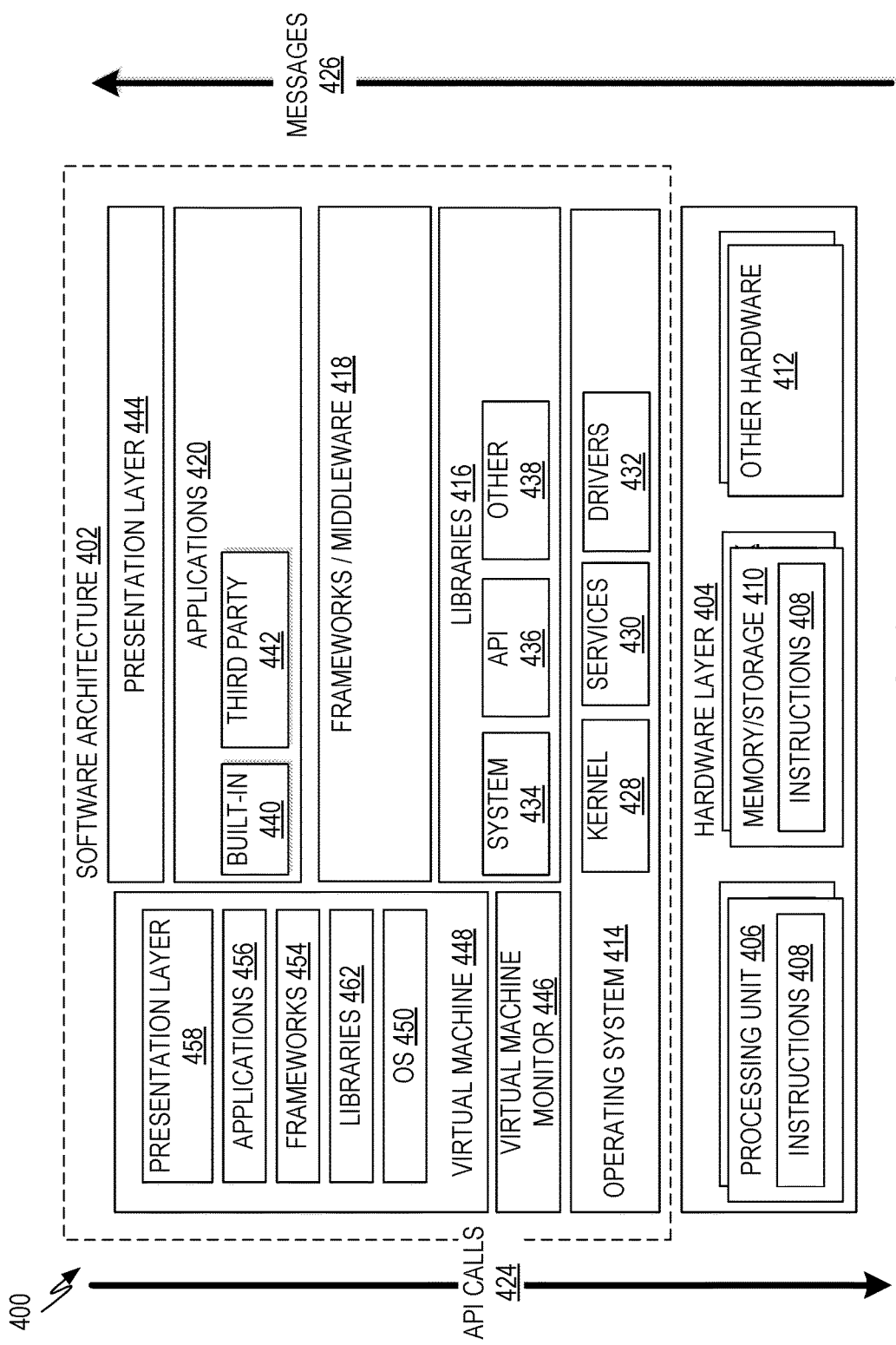
FIG. 4 is a block diagram illustrating an example of a software architecture that may be installed on a machine, according to some example embodiments.

FIG. 4 is a block diagram 400 illustrating a representative software architecture 402, which may be used in conjunction with various hardware architectures herein described. FIG. 4 is merely a non-limiting example of a software architecture and it will be appreciated that many other architectures may be implemented to facilitate the functionality described herein. The software architecture 402 may be executing on hardware such as machine 400 of FIG. 4 that includes, among other things, processors 410, memory 430, and I/O components 460. A representative hardware layer 404 is illustrated and can represent, for example, the machine 400 of FIG. 4. The representative hardware layer 404 comprises one or more processing units 406 having associated executable instructions 408. Executable instructions 408 represent the executable instructions of the software architecture 402, including implementation of the methods, modules and so forth of FIGS. 1-3. Hardware layer 404 also includes memory and/or storage modules 410, which also have executable instructions 408. Hardware layer 404 may also comprise other hardware as indicated by 412 which represents any other hardware of the hardware layer 404, such as the other hardware illustrated as part of machine 400.

In the example architecture of FIG. 4, the software 402 may be conceptualized as a stack of layers where each layer provides particular functionality. For example, the software 402 may include layers such as an operating system 414, libraries 416, frameworks/middleware 418, applications 420 and presentation layer 422. Operationally, the applications 420 and/or other components within the layers may invoke application programming interface (API) calls 424 through the software stack and receive a response, returned values, and so forth illustrated as messages 426 in response to the API calls 424. The layers illustrated are representative in nature and not all software architectures have all layers. For example, some mobile or special purpose operating systems may not provide a frameworks/middleware layer 418, while others may provide such a layer. Other software architectures may include additional or different layers.

The operating system 414 may manage hardware resources and provide common services. The operating system 414 may include, for example, a kernel 428, services 430, and drivers 432. The kernel 428 may act as an abstraction layer between the hardware and the other software layers. For example, the kernel 428 may be responsible for memory management, processor management (e.g., scheduling), component management, networking, security settings, and so on. The services 430 may provide other common services for the other software layers. The drivers 432 may be responsible for controlling or interfacing with the underlying hardware. For instance, the drivers 432 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 416 may provide a common infrastructure that may be utilized by the applications 420 and/or other components and/or layers. The libraries 416 typically provide functionality that allows other software modules to perform tasks in an easier fashion than to interface directly with the underlying operating system 414 functionality (e.g., kernel 428, services 430 and/or drivers 432). The libraries 416 may include system 434 libraries (e.g., C standard library) that may provide functions such as memory allocation functions, string manipulation functions, mathematic functions, and the like. In addition, the libraries 416 may include API libraries 436 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 416 may also include a wide variety of other libraries 438 to provide many other APIs to the applications 420 and other software components/modules.

The frameworks 418 (also sometimes referred to as middleware) may provide a higher-level common infrastructure that may be utilized by the applications 420 and/or other software components/modules. For example, the frameworks 418 may provide various graphic user interface (GUI) functions, high-level resource management, high-level location services, and so forth. The frameworks 418 may provide a broad spectrum of other APIs that may be utilized by the applications 420 and/or other software components/modules, some of which may be specific to a particular operating system or platform.

The applications 420 includes built-in applications 440 and/or third party applications 442. Examples of representative built-in applications 440 may include, but are not limited to, a contacts application, a browser application, a book reader application, a location application, a media application, a messaging application, and/or a game application. Third party applications 442 may include any of the built in applications as well as a broad assortment of other applications. In a specific example, the third party application 442 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 442 may invoke the API calls 424 provided by the mobile operating system such as operating system 414 to facilitate functionality described herein.

The applications 420 may utilize built in operating system functions (e.g., kernel 428, services 430 and/or drivers 432), libraries (e.g., system 434, APIs 436, and other libraries 438), frameworks/middleware 418 to create user interfaces to interact with users of the system. Alternatively, or additionally, in some systems interactions with a user may occur through a presentation layer, such as presentation layer 444. In these systems, the application/module "logic" can be separated from the aspects of the application/module that interact with a user.

Some software architectures utilize virtual machines. In the example of FIG. 4, this is illustrated by virtual machine 448. A virtual machine creates a software environment where applications/modules can execute as if they were executing on a hardware machine (such as the machine of FIG. 4, for example). A virtual machine is hosted by a host operating system (operating system 414 in FIG. 4) and typically, although not always, has a virtual machine monitor 446, which manages the operation of the virtual machine as well as the interface with the host operating system (i.e., operating system 414). A software architecture executes within the virtual machine such as an operating system 450, libraries 452, frameworks/middleware 454, applications 456 and/or presentation layer 458. These layers of software architecture executing within the virtual machine 448 can be the same as corresponding layers previously described or may be different.

Example Machine Architecture and Machine-Readable Medium

Figure 5:
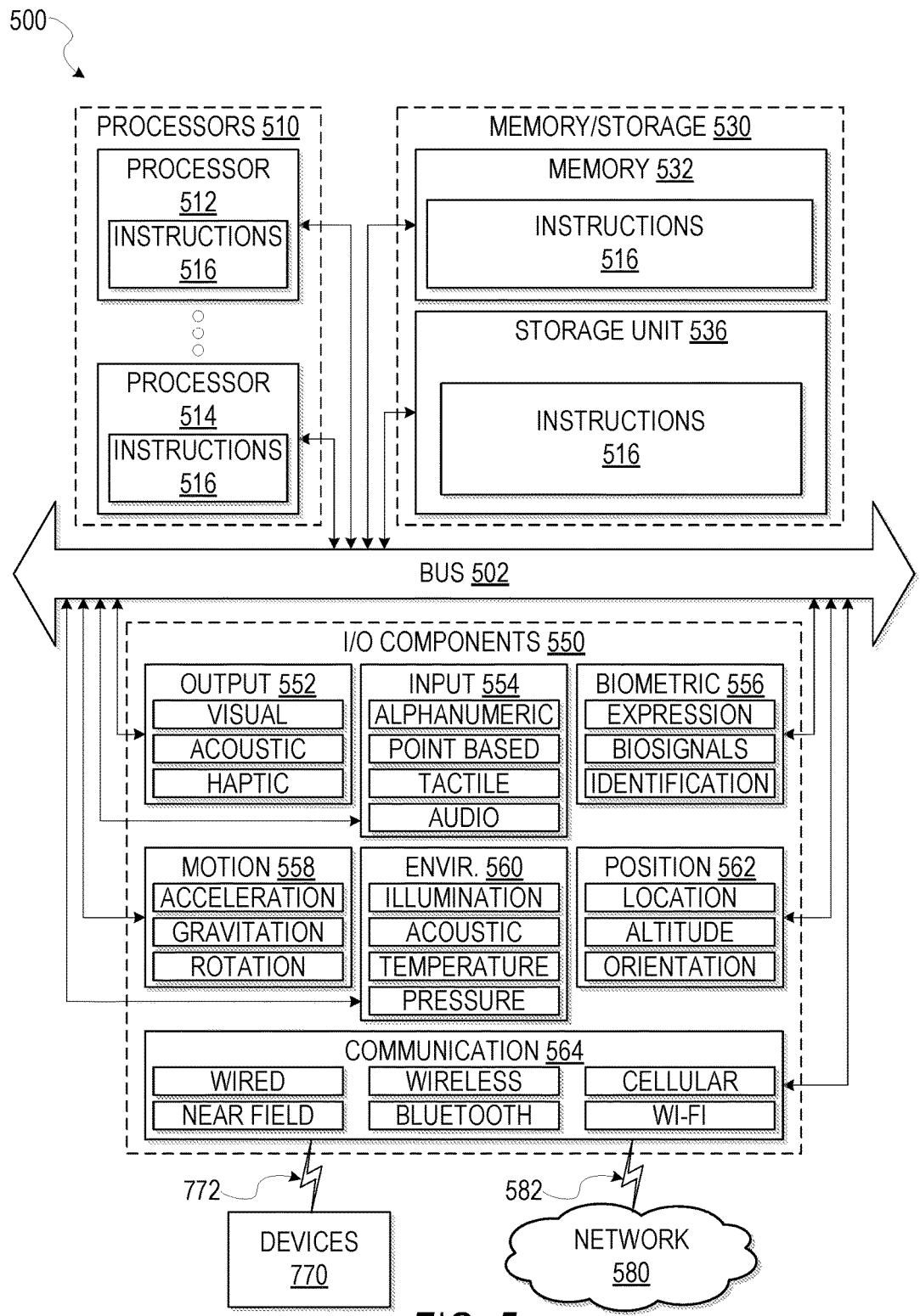
FIG. 5 illustrates a diagrammatic representation of a machine in the form of a computer system within which a set of instructions may be executed for causing the machine to perform any one or more of the methodologies discussed herein, according to an example embodiment.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a computer system, within which instructions 516 (e.g., software, a program, an application, an applet, an app, or other executable code) for causing the machine 500 to perform any one or more of the methodologies discussed herein may be executed. For example the instructions may cause the machine to execute the methodologies discussed herein. Additionally, or alternatively, the instructions may implement any modules discussed herein. The instructions transform the general, non-programmed machine into a particular machine programmed to carry out the described and illustrated functions in the manner described. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 512 and processor 514 that may execute instructions 516. The term "processor" is intended to include multi-core processor that may comprise two or more independent processors (sometimes referred to as "cores") that may execute instructions contemporaneously. Although FIG. 5 shows multiple processors, the machine 500 may include a single processor with a single core, a single processor with multiple cores (e.g., a multi-core process), multiple processors with a single core, multiple processors with multiples cores, or any combination thereof.

The memory/storage 530 may include a memory 532, such as a main memory, or other memory storage, and a storage unit 536, both accessible to the processors 510 such as via the bus 502. The storage unit 536 and memory 532 store the instructions 516 embodying any one or more of the methodologies or functions described herein. The instructions 516 may also reside, completely or partially, within the memory 532, within the storage unit 536, within at least one of the processors 510 (e.g., within the processor's cache memory), or any suitable combination thereof, during execution thereof by the machine 500. Accordingly, the memory 532, the storage unit 536, and the memory of processors 510 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 516. The term "machine-readable medium" shall also be taken to include any medium, or combination of multiple media, that is capable of storing instructions (e.g., instructions 516) for execution by a machine (e.g., machine 500), such that the instructions, when executed by one or more processors of the machine 500 (e.g., processors 510), cause the machine 500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 550 may include a wide variety of components to receive input, provide output, produce output, transmit information, exchange information, capture measurements, and so on. The specific I/O components 550 that are included in a particular machine will depend on the type of machine. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion and the grouping is in no way limiting. In various example embodiments, the I/O components 550 may include output components 552 and input components 554. The output components 552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562 among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 550 may include communication components 564 operable to couple the machine 700 to a network 580 or devices 570 via coupling 582 and coupling 572 respectively. For example, the communication components 564 may include a network interface component or other suitable device to interface with the network 580. In further examples, communication components 564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a Universal Serial Bus (USB)).

Moreover, the communication components 564 may detect identifiers or include components operable to detect identifiers. For example, the communication components 564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 580 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 580 or a portion of the network 580 may include a wireless or cellular network and the coupling 582 may be a Code Division Multiple Access (CDMA) connection, a Global System for Mobile communications (GSM) connection, or other type of cellular or wireless coupling. In this example, the coupling 582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 516 may be transmitted or received over the network 580 using a transmission medium via a network interface device (e.g., a network interface component included in the communication components 564) and utilizing any one of a number of well-known transfer protocols (e.g., hypertext transfer protocol (HTTP)). Similarly, the instructions 516 may be transmitted or received using a transmission medium via the coupling 572 (e.g., a peer-to-peer coupling) to devices 570. The term "transmission medium" shall be taken to include any intangible medium that is capable of storing, encoding, or carrying instructions 516 for execution by the machine 500, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A device for forming an image of an object, the object positioned at a finite distance away from the device, comprising:
   a top waveguide having a top surface facing the object, a bottom surface parallel to the top surface, and a first end along an edge of the top waveguide;
   a multi-pixel detector disposed at the first end of the top waveguide;
   a top multi-region phase modulator positioned along the top surface of the top waveguide;
   a controller configured to receive position data corresponding to the finite distance to the object, the controller further configured to energize the top multi-region phase modulator in response to the position data such that when energized, the top multi-region phase modulator directs at least a first fraction of light from the object into the top waveguide and forms an image of the object on the multi-pixel detector;
   a bottom waveguide having a top surface positioned proximate the bottom surface of the top waveguide, a bottom surface parallel to the top surface of the bottom waveguide, and a first end along an edge of the bottom waveguide;
   a multi-pixel image panel disposed at the first end of the bottom waveguide; and
   a bottom multi-region phase modulator positioned along the bottom surface of the bottom waveguide;
   wherein the controller is further configured to energize the bottom multi-region phase modulator in response to the position data such that when energized, the bottom multi-region phase modulator directs at least a second fraction of light from the multi-pixel image panel out of the bottom waveguide and forms a virtual image of the multi-pixel image panel in a plane coincident with the object, and
   wherein the controller is further configured such that the bottom lens pattern extends only partially over the bottom multi-region phase modulator in an area corresponding to a position of the object in a field of view.

2. The device of claim 1, wherein the controller is further configured to energize the top multi-region phase modulator in a top lens pattern having a focal length selected to form the image of the object in a plane coincident with the multi-pixel detector.

3. The device of claim 2, wherein the top lens pattern includes at least portions of a first plurality of concentric circles, the first plurality of concentric circles becoming more closely spaced at increasing distances from a center of the first plurality of concentric circles.

4. The device of claim 2, wherein:
   the controller is further configured to select the first fraction of light directed by the top multi-region phase modulator into the top waveguide; and
   the first fraction of light corresponds to a first order diffraction efficiency of the top lens pattern.

5. The device of claim 4, wherein:
   the top waveguide and the top multi-region phase modulator are at least partially transparent when viewed through the bottom and top surfaces; and the transparency of the top waveguide and the top multi-region phase modulator correspond to a zeroth order diffraction efficiency of the top lens pattern.

6. The device of claim 2, wherein the controller is further configured such that the top lens pattern extends fully over the top multi-region phase modulator.

7. The device of claim 2, wherein the controller is further configured such that the top lens pattern extends only partially over the top multi-region phase modulator in an area corresponding to a position of the object in a field of view.

8. The device of claim 1, wherein the controller is further configured to energize the bottom multi-region phase modulator in a bottom lens pattern having a focal length selected to form the virtual image of the multi-pixel image panel in the plane coincident with the object.

9. The device of claim 8, wherein the bottom lens pattern includes at least portions of a second plurality of concentric circles, the second plurality of concentric circles becoming more closely spaced at increasing distances from a center of the second plurality of concentric circles.

10. The device of claim 9, wherein:
the controller is further configured to select the second fraction of light directed by the bottom multi-region phase modulator out of the bottom waveguide; and
the second fraction of light corresponds to a first order diffraction efficiency of the bottom lens pattern.

11. The device of claim 10, wherein the top waveguide, the top multi-region phase modulator, the bottom waveguide, and the bottom multi-region phase modulator are at least partially transparent when viewed through the bottom surface of the bottom waveguide to the top surface of the top waveguide.

12. The device of claim 1, wherein the top surface of the bottom waveguide is spaced apart from the bottom surface of the top waveguide.

\* \* \* \* \*